Figure 1:
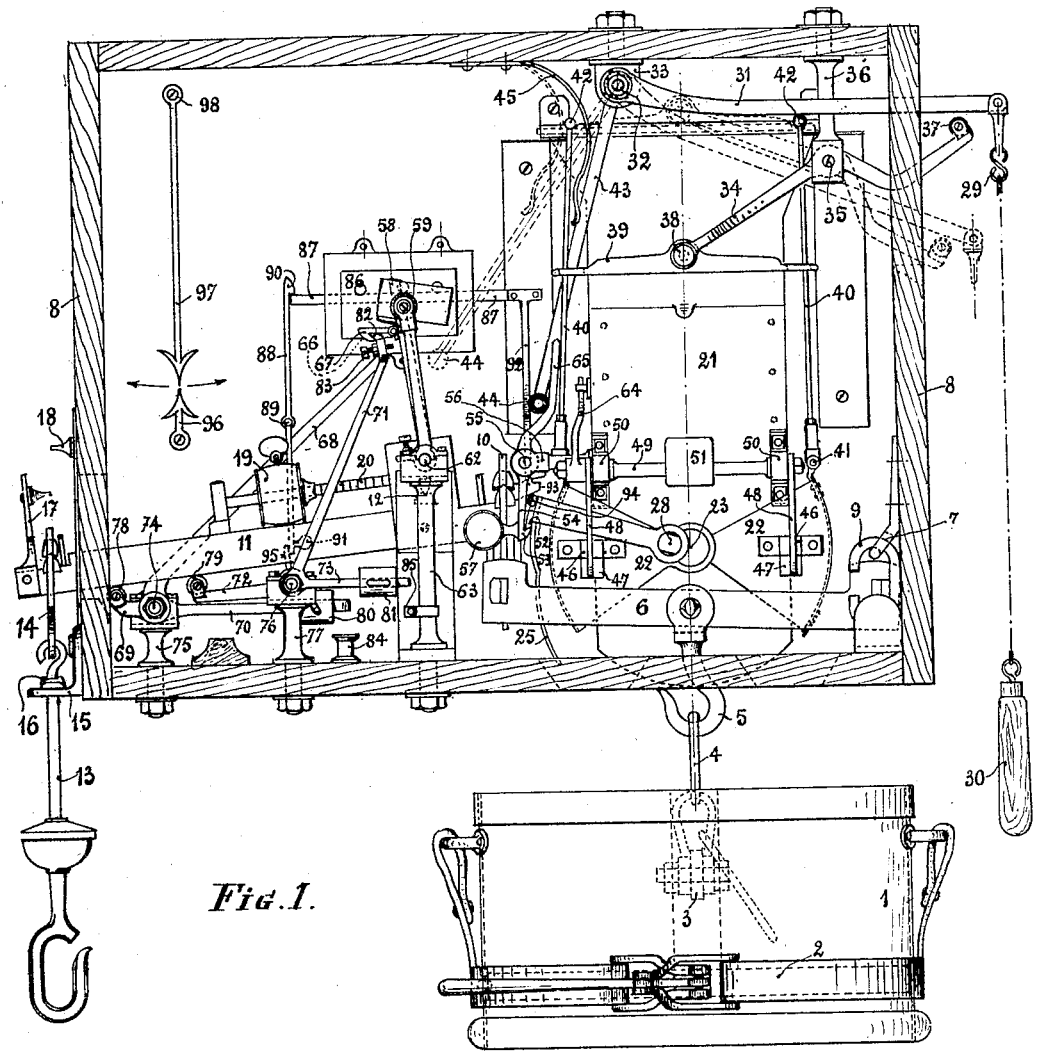

May 15, 1923. 1,455,658
T. M. POUMADE
AUTOMATIC GRAIN WEIGHING AND SACK FILLING MACHINE
Filed Aug. 13, 1921 4 Sheets-Sheet 1

Inventor:
Théodore Marc Poumade
per, [signature]
Attorney.

May 15, 1923.

T. M. POUMADE 1,455,658

AUTOMATIC GRAIN WEIGHING AND SACK FILLING MACHINE

Filed Aug. 13, 1921    4 Sheets-Sheet 3

Inventor:
Théodore Marc Poumade
per, Jevers
Attorney.

May 15, 1923.  1,455,658
T. M. POUMADE
AUTOMATIC GRAIN WEIGHING AND SACK FILLING MACHINE
Filed Aug. 13, 1921  4 Sheets-Sheet 4

Inventor:
Théodore-Marc Poumade
per, Sievers
Attorney.

Patented May 15, 1923.

1,455,658

UNITED STATES PATENT OFFICE.

THÉODORE MARC POUMADE, OF MARSEILLE, FRANCE.

AUTOMATIC GRAIN-WEIGHING AND SACK-FILLING MACHINE.

Application filed August 13, 1921. Serial No. 492,182.

*To all whom it may concern:*

Be it known that I, THÉODORE MARC POUMADE, a French subject, residing at Marseille, France, 234 Boulevard National, have invented a certain Improved Automatic Grain-Weighing and Sack-Filling Machine, of which the following is a specification.

The present invention relates to an automatic grain-weighing and sack-filling machine, and is mainly characterized by the combination of a balance with a mechanism controlling the delivery of the grain in such a way as to stop automatically the said delivery at the exact moment when the required weight is obtained. To this effect, the opening for the delivery of the grain is shut by means of two doors, hereinafter referred to as large delivery doors, in one of which is provided a smaller door, hereinafter referred to as the small delivery door, which is, after the closing, effected automatically, of the large delivery doors, held in the open position to allow the delivery through the opening which thus subsists in one of the large delivery doors of the quantity of grain required to complete the weighing operation. When the latter result is obtained, the small delivery door is also closed in an automatic manner.

The automatic grain-weighing and sack-filling machine is enclosed in a case slung from the grain container, and the grain for filling the sacks is delivered by means of a closed chute. A drum, to which the sacks to be filled are secured, is suspended under the delivery opening of the chute to a bridge which acts on the end of the beam of the balance opposed to that to which the weights are suspended. A system of levers, operated by simple traction on a chain, opens the grain delivery doors, which are held in open position by hooks provided at the end of suitable counterweighted levers and which engage noses or lugs provided on the delivery doors, and simultaneously the said system of levers places two hammers, adapted to act on the levers retaining the delivery doors in the open position, in a position where they are engaged and held by noses of counterweighed compensators subjected to the action of the movement of the beam, in such a way that, when the weight is nearly obtained one of the compensators releases the first hammer which strikes the lever retaining the large delivery doors and thus causes the latter to be closed, and that as the weighing operation is completed the other compensator releases the second hammer which strikes the lever retaining the small delivery door which is consequently closed in turn and thus obturates the opening which subsisted in one of the large delivery doors exactly at the moment when the falling column of grain is sufficient to complete the required weight.

In order that the invention may be more readily understood, an embodiment of same is, by way of example only, illustrated by the accompanying drawings, in which:

Fig. 1 shows the automatic grain weighing and sack-filling machine according to the present invention in longitudinal elevation in the working position, that is to say, when the delivery doors are held in the open position to allow the delivery of the grain.

Figure 2:
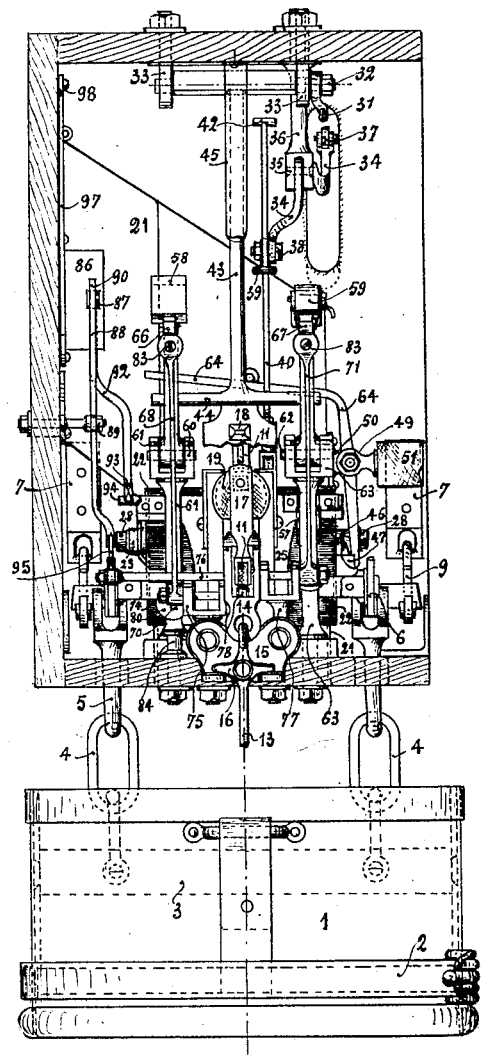
Figure 3:
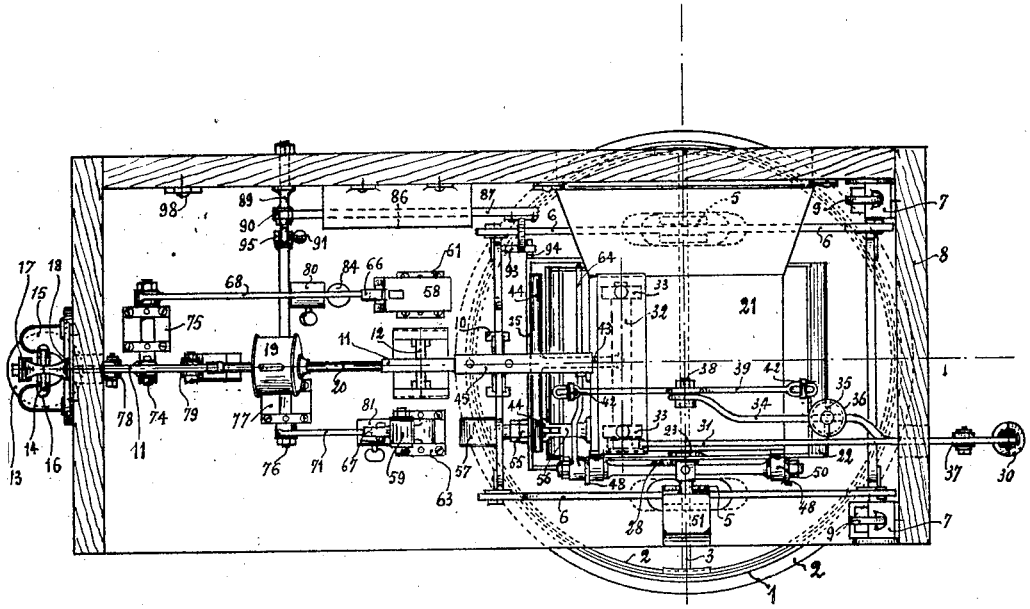
Figure 4:
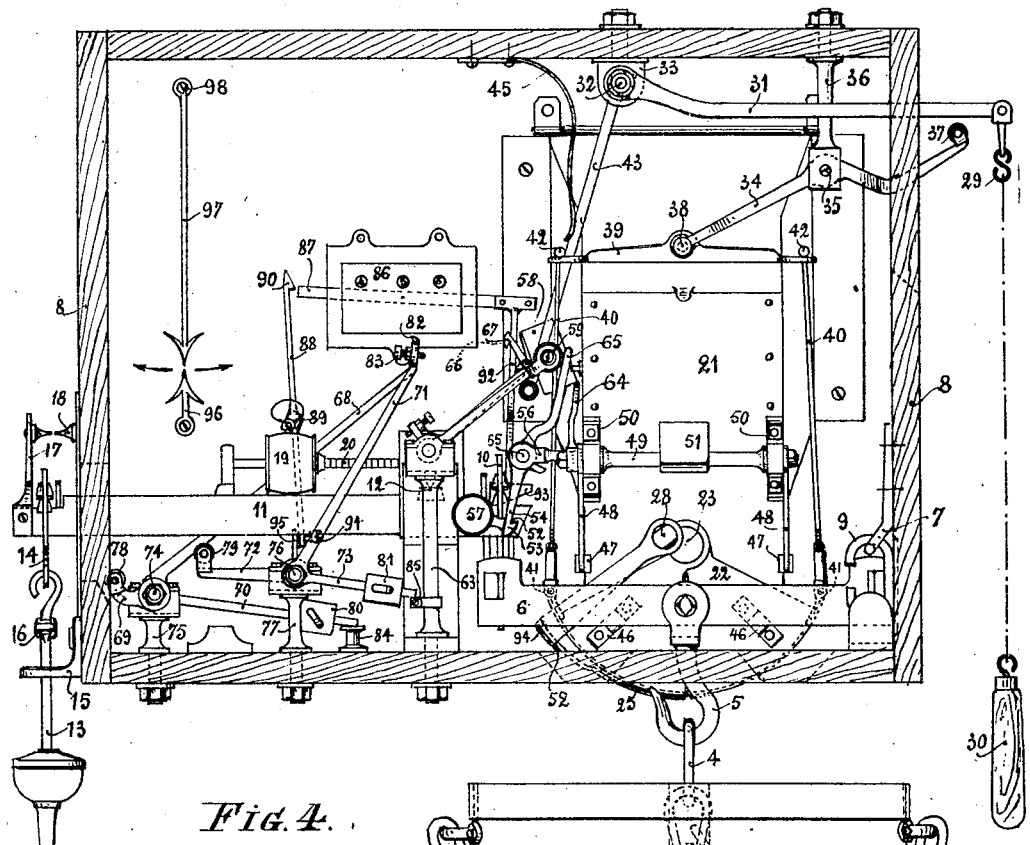

Fig. 2 is an end elevation of the machine in the same position as that illustrated by Fig. 1, one of the ends of the case having been omitted for the sake of clearness, Fig. 3 shows a plan of the machine in the same position as that illustrated by Figs. 1 and 2, the upper side of the case having been omitted, Fig. 4 represents a longitudinal elevation of the said weighing machine in the rest position, that is to say when the grain delivery doors are closed and the desired weight obtained.

Figure 5:
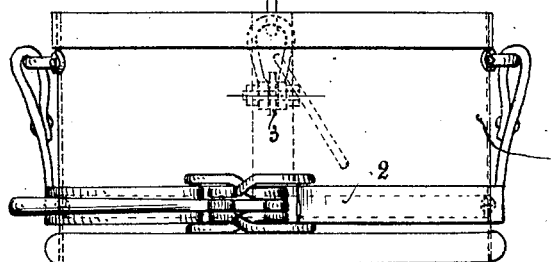
Figure 5:
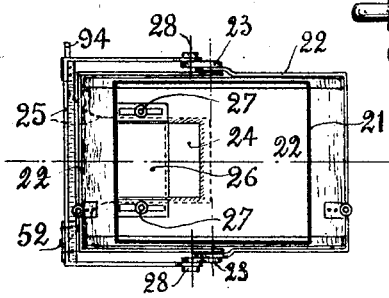

Fig. 5 illustrates in detail the inner side of the large delivery doors in one of which a small delivery opening is provided.

Referring to the drawings, 1 indicates a drum, to which the sacks may be secured by means of a lever-strap 2. The drum 1 is provided inside with a diametral cross bar 3 to which are secured by means of bolts links 4 by means of which the drum 1 is suspended to two hooks 5 which are in turn suspended to the centre of two longitudinal members of a bridge 6. This bridge 6 constitutes an equal armed lever of which one of the ends is suspended to rings 7 fixed to the case 8 enclosing the machine by means of split-links 9, while the other end influences, through a strap-link 10, one of the ends of the beam 11. The said beam 11 constitutes an unequal armed lever having its fulcrum at 12 and the lengths of the arms formed respectively by the distance between the fulcrum and the point of application of the load through the strap-link 10 and the distance between the fulcrum and the point of application of the resistance are in the proportion of 1 to 5. The resistance is constituted by weights suspended to the weight-hanger 13 which is loaded with 1/10 of the weight to be balanced, and which is in turn suspended to the corresponding end of the beam 11 by means of a strap-link 14; the weight-hanger 13 is guided in a bracket 15 fixed to the case 8 and is at the upper end provided with a pivoted cross piece 16 which, in cooperation with the bracket 15 allows the weight to rest without risk of the knife-bearing being damaged and prevents the wedging of the beam in all the positions of the machine. The end of the longest arm of the beam 11 is provided with an index 17, which, in cooperation with a second index 18 secured to the case 8, indicates when the weighing operation is completed. All the points of suspension of the machine and the fulcrum of the lever are constituted by knife-bearings, and a movable counterpoise 19 adapted to slide on a graduated ruler 20 secured to the beam 11 is provided to compensate the tare of the empty sacks.

The delivery opening of the chute 21 is shut by means of two cylindrical or sector-shaped doors 22 or large delivery doors mounted on a common axis 23. In one of the doors 22 (see Fig. 5) is provided an opening 24 which may be opened or closed by means of a small delivery door 25, and a plate 26 adapted to slide against the inner face of the large delivery door with the opening 24, and to be fixed in position by means of two screws 27 allows the adjustment of the size of the opening 24 according to the specific gravity or the quality of the grain to be weighed. The small delivery door 25 is mounted on pivots 28 provided on the sectors or lateral faces of the corresponding large delivery door 22 and of which the axis is eccentric to a certain amount in relation to the axis 23 of the doors 22, so that, while the small delivery door 25 is adapted hermetically against the opening 24 when it is shut, during its opening the said small door 25 moves progressively away from the door 22 owing to the eccentricity of the axis 28 relatively to the axis 23, in such a way that any wedging of the small delivery door 25 due to obstacles likely to prevent the closing of the said door 25 is avoided. The mechanism for opening the delivery doors comprises a traction chain 29 provided with a handle 30 and attached to the free end of a lever 31 mounted rigidly on a transverse rod 32 adapted to rotate in two brackets 33 secured to the upper side of the case 8. A lever 34 pivoted at 35 in a bracket 36 secured to the upper side of the case 8 is arranged in such a manner that its free end, provided with a roller 37, comes into contact with the lever 31 when the latter is lowered, the other end of the lever 34 being connected by means of a pivot 38 to a transverse member 39 of which the two ends are provided with holes to allow the passage therethrough of two vertical rods 40 which are at their lower ends connected by means of pivots 41 to the doors 22 and are at their upper ends provided with transverse abutment pieces 42. When the handle 30 of the chain 29 is pulled, in order to open the delivery doors, the lever 31 on being lowered will cause the lever 34 to rock and thus to lift the transverse member 39 and the latter, through the abutment of its ends against the transverse abutment pieces 42, will raise the vertical rods 40 and thus open the delivery doors for the grain. The position taken by the parts of the mechanism for opening the delivery doors, when the lever 31 is lowered by pulling the chain 29, is indicated in dotted lines on Fig. 1. On the transverse rod 32 is also firmly secured a rod 43 provided at its lower end with a cross bar 44 and subjected to the action of a blade spring 45. The lowering of the lever 31 will thus also cause, owing to the rotation of the transverse rod 32, the rod 43 and the cross bar 44 to move and to take the position indicated in dotted lines on Fig. 1, but the spring 45 tends to bring back the rod 43 and simultaneously the mechanism for opening the delivery doors, to their initial position as soon as the pull on the chain 29 stops. The large delivery doors 22 are on their front lateral sectors, provided with noses or lugs 46 which, when the said doors are opened, are engaged by hooks 47 of levers 48 mounted rigidly on a shaft 49 supported in bearings 50 fixed to the chute 21 and which also carries a rod provided with a counterbalance weight 51, the latter tending to maintain the hooks 47 of the levers 48 in position of engagement with the lugs 46 of the doors 22 when the latter are open, so that they cannot be closed until the hooks 47 release the lugs 46. The small delivery door 25 is also provided with a nose 52 which is, when the said door 25 is open, engaged and held by a hook 53 at the end of a lever arm 54 which is mounted on a pivot 55 in a bracket 56 fixed to the chute 21, the lever arm 54 being at its lower end provided with a counterbalance weight 57 which tends to maintain the hook 53 in the position where it engages the nose 52 and retains the small delivery door 25 in the open position. On the movement of the cross bar 44 obtained through the lowering of the lever 31 the said bar 44 comes into contact with the shanks of a big hammer 58 and of a small hammer 59. The hammer 58 is at its lower end mounted on a pivot 60 maintained in a standard 61 while the hammer 59 is at its lower end mounted on a pivot 62 maintained in a standard 63. The big hammer 58 is arranged in such a manner that when it falls, it will strike a lever 64 fixed rigidly on the shaft 49 of the levers 48 which retain the large delivery doors 22 in the open position and thus cause a movement of the levers 48 and of their hooks 47 which will result in the lugs 46 being released so as to allow the closing of the large delivery doors 22. Similarly, the small hammer 59 is arranged in such a manner that when it falls it will strike a lever arm 65 integral with the lever 54 retaining the small delivery door 25 in the open position and thus cause a withdrawal of the hook 53 which will result in the nose 52 being released so as to allow the closing of the small delivery door 25. The hammers 58 and 59 are, at their rear end, provided with hooks 66 and 67 respectively which, when the hammers are in the position where they are placed through the movement of the cross bar 44 when the lever 31 is lowered to open the delivery doors, are engaged and held by compensators under the influence of the movement of the beam 11. Each of the said compensators comprises three arms, the three arms 68, 69 and 70 of the compensator of the big hammer 58 being mounted rigidly on a common pivot 74 maintained in a standard 75 secured to the case 8, while the three arms 71, 72 and 73 of the compensator of the small hammer 59 are fixed rigidly on a common shaft 76 mounted pivotally in a standard 77 also secured to the case 8. The arms 69 and 72 of the compensators are provided at their free ends with rollers 78 and 79 respectively which are, owing to the action of counterbalance weights 80 and 81 respectively provided on the arms 70 and 73 of the said compensators, maintained in contact with the lower edge of the longer arm of the beam 11. The arms 68 and 71 of the said compensators have their upper ends constituted by noses 82 which are positioned in front of the hooks 66 and 67 of the hammers 58 and 59 so as to prevent the accidental passage of the latter from the set inoperative to the operative position under the influence of impacts when the long arm of the beam 11 is lowered but are withdrawn so as to release the said hooks 66 and 67 and thus allow the fall of the hammers when the long arm of the beam 11 returns to the horizontal position, thereby allowing the rollers 78 and 79 to rise. The upper portions of the arms 68 and 71 of the compensators are also provided with push-screws 83 for the shank of the hammers 58 and 59, and the counterbalance weights 80 and 81 are movable along the arms 70 and 73. The roller 79 being nearer the fulcrum of the beam than the roller 78 and the amplitude of the movement of the large compensator for a movement of given angle of the beam being therefore greater than the amplitude of the movement of the small compensator for this same movement of the beam, the movement of the large compensator under the influence of its weight 80 will be of sufficient amplitude to release the hook 66 and to bring the corresponding push screw 83 in contact with the hammer 58 before the movement of the small compensator under the influence of its weight 81 is of sufficient amplitude to release the hook 67 and to bring the corresponding push-screw 83 to bear on the hammer 59. It will be noticed that by adjusting the push-screws 83 the exact amplitude of the movement of the compensators necessary to bring the latter to bear on the hammers may be varied, while by varying the position of the weights 80, 81 the action of the compensators may be adjusted to suit the resistance which has to be overcome to bring the hammers from their set inoperative position to the position wherein their centre of gravity is vertically above the centre of their pivot, beyond which position they fall under the action of their own gravity. This adjustment of the weights 80 and 81 and the push screws 83 is affected in such a way that the nose 82 of the arm 68 releases the hook 66 and the corresponding push-screw 83 causes the big hammer 58 to strike when the greater portion of the required weight is obtained while the nose 82 of the arm 71 releases the hook 67 and the corresponding push-screw 83 causes the small hammer 59 to strike at the exact moment when the falling column of grain from the small delivery opening 24 suffices to complete the weighing operation. In other words, the compensators are adjusted and arranged in such a manner that it is necessary for the longer arm of the beam 11 to have effected the greater part of its movement of return to the horizontal before the roller 78 is able to rise sufficiently to allow the release of the big hammer 58 and cause same to strike and for the said longer arm of the beam 11 to have almost entirely reached its initial horizontal position before the roller 79 is able to rise sufficiently to allow the release of the small hammer 59 and cause same to strike also.

Abutments 84 and 85 are provided respectively for the ends of the arms 70 and 73 of the compensators in order to limit the movement of the latter. The rollers 78 and 79 at the end of the respective arms 69 and 72 are provided in order to avoid friction and wear on the beam 11 and to obtain a softer and more regular movement. A counter or registering instrument 86 is secured on the case 8 to indicate the number of sacks weighed, and the said counter marks one unit for each oscillation of a horizontal rod 87 which passes through same. A lever 88, mounted on a pivot 89 fixed to the case and provided with a hook 90 at its upper end and with a counterbalance weight 91 at its lower end normally retains, through the said hook 90, the rod 87 of the counter in the horizontal position. The end of the rod 87 of the counter opposed to that which is engaged by the hook 90 is provided with a vertical rod 92 which has its upper end riveted thereto and which is at its lower end provided with an abutment 93 which bears on a pin 94 integral with the small delivery door 25 when the latter is in the open position. A cam 95 provided on the end of an extension of the shaft 76 of the small compensator is arranged in such a manner as to act on the lower end of the lever 88 to disengage the hook 90 which retains the rod 87 of the counter and thus release the said rod 87 at the moment when the small compensator allows the small hammer 59 to strike and consequently the small delivery door 25 to close. At this moment, the rod 87 being nomore engaged by the hook 90 it is able to oscillate and the counter is therefore allowed to mark. When the doors are opened again, the pin 94 of the small delivery door 25, as it comes in contact with the abutment 93 of the vertical rod 92, replaces the rod 87 of the counter in the horizontal position, where its free end is again engaged by the safety hook 90 of the lever 88. It will be observed that the safety hook 90 will prevent the counter 86 marking up till the moment when the said hook is disengaged through the action of the cam 95 secured on the shaft 76 of the small compensator, that is to say up till the moment when the small compensator allows the small hammer 59 to strike and thus to cause the closing of the small delivery door 25, which occurs only when the weight required is obtained, as the position of the cam 95 on the shaft 76 of the small compensator is such that the safety hook 90 will be disengaged through the action of the said cam only at the moment when the beam 11, on reaching its horizontal position will allow the small compensator to cause the closing of the small delivery door. In order to give the weighing operation all the precision required, a device comprising a fixed arrow 96 secured to the case 8 and a movable arrow 97 able to oscillate about a pivot 98 also secured to the case 8, allows to verify whether the machine is level or not. The operation of the automatic grain-weighing and sack-filling machine according to the present invention is extremely simple: after having attached a sack to the drum 1 by means of the lever strap 2, it is sufficient to pull on the chain 29 by means of the handle 30 to open the large and small delivery doors in order to allow the delivery of the grain; when the required weight is nearly obtained, the large delivery doors are closed automatically while the small delivery opening in one of the said large delivery doors remains open to allow the subsequent delivery of the quantity of grain necessary to complete the weighing operation; then, when the desired weight is obtained, the small delivery door is also closed in an automatic manner while simultaneously the counter or registering instrument automatically registers the operation.

It should be observed that when the beam is in the horizontal position at the conclusion of the weighing operation, the balance is entirely free and independent from the mechanism for opening and closing the delivery doors, which allows the verification of the accuracy of the weighing operation.

It should be understood that the invention is in no way limited either in scope or in its spirit by the details of execution of the illustrative embodiment of the invention shown in the accompanying drawings.

I claim:

1. In an automatic grain-weighing and sack-filling machine, an unequal armed beam fulcrumed at one-sixth of its length, adjustable means on said beam for compensating the tare of the sacks, a guided weight hanger freely suspended from the end of the longest arm of said beam, a bridge freely suspended at one end to a stationary part of the machine and at the other from the end of the shortest arm of the beam and having a drum freely suspended at its centre and adapted to have the sack removably secured thereto, in combination with: a pair of semi-cylindrical large delivery doors having sector-shaped sides, mounted on a common pivot and normally closing the mouth of the delivery chute under the action of their own gravity; an adjustable small discharge opening in one of said doors; a small delivery door normally closing said opening and having arms pivoted to the sides of the corresponding large door at a point eccentric to the pivot of said door; hand-operated means for opening simultaneously the large and small doors; lugs on the said doors; hook-ended weighted levers for retaining the two large doors and the small door in open position by engagement with said lugs; a big and a small pivoted trip-hammer adapted to cause said levers to release respectively the two large and the small doors; spring-influenced hand-operated means for setting said hammers in the inoperative position jointly with the opening of the doors; hooks at the rear of the mass of said hammers; means under the direct influence of the beam for causing the big and the small hammers successively to pass from the set inoperative to the operative position, said means consisting of the pivoted three-armed compensators having one arm fitted at the end with a roller in operative contact with the underside of the beam at a different distance from the latter's fulcrum for each compensator and a second arm, opposite the first, provided with an adjustable weight, a nose formed at the end of the third arm of said compensators and adapted to engage the hook of the corresponding hammer and an adjustable push-screw for the said corresponding hammer carried by said arm immediately below said nose; stationary abutments for the weighted arms of aforesaid compensators whereby the latter's movement is stopped just before the beam completely reaches its balanced position; and means for registering each weighing operation; all substantially as described.

2. In an automatic grain-weighing and sack-filling machine, according to claim 1, means for adjusting the size of the small discharge opening, said means consisting of a plate slidably mounted against the inner face of the large delivery door provided with said opening, and a pair of screws for fixing said plate in its adjusted position, said screws being slidable in suitable slots of the said large door, substantially as described.

3. In an automatic grain-weighing and sack-filling machine, according to claim 1, hand-operated means for opening simultaneously the large and small doors and jointly setting the big and small hammers in the inoperative position, comprising: a lever arm rigidly mounted on a rotatable shaft; a chain attached to the free end of said lever arm; a pivoted lever having one end fitted with a roller in operative contact with the underside of said lever arm near the free end of the latter; a transverse horizontal member centrally pivoted to the other end of said pivoted lever; a pair of substantially vertical rods freely extending through the ends of said horizontal member and having their lower ends pivotally connected to the respective large delivery doors; abutments at the upper end of said vertical rods; a T-shaped member rigidly mounted on the shaft of aforesaid lever arm and adapted to engage the stalks of aforesaid hammers; and a return blade-spring exerting a permanent pressure on said T-shaped member; substantially as described.

4. In an automatic grain-weighing and sack-filling machine according to claim 1, in combination with a counter of suitable known construction, the pivoted weighted lever 88 having a safety hook 90 normally engaging one end of the tilting operating rod 87 of said counter; the arm 95 rigidly mounted on a pivot-extension of the compensator for the small hammer and in operative contact with the lower end of said lever 88; the vertical rod 92 riveted to the other end of the counter operating-rod 87 and having an abutment 93 at its lower end; and the pin 94 on the small delivery door, adapted to engage positively said abutment 93 in the open position of said door; substantially as described.

In testimony thereof I signed hereunto my name in the presence of two subscribing witnesses.

THÉODORE MARC POUMADE.

Witnesses:
 EUGÈNE DRUASSON,
 SUZANNE BOULET.